United States Patent [19]

Farr

[11] 4,436,348

[45] Mar. 13, 1984

[54] ANTI-SKID HYDRAULIC BRAKING SYSTEMS FOR VEHICLES

[75] Inventor: Glyn P. R. Farr, Warwickshire, England

[73] Assignee: Lucas Industries, Birmingham, England

[21] Appl. No.: 433,233

[22] Filed: Oct. 7, 1982

[30] Foreign Application Priority Data

Oct. 13, 1981 [GB] United Kingdom ............... 8130883

[51] Int. Cl.³ .............................................. B60T 8/02
[52] U.S. Cl. ..................................... 303/115; 303/119
[58] Field of Search ............... 303/115, 116, 119, 113, 303/92, 114, 91, 61–63, 68–69, 10–12; 188/181 A, 181 R, 181 C

[56] References Cited

U.S. PATENT DOCUMENTS 4,017,126  4/1977  Ohta ...................................... 303/115
4,095,851  6/1978  Ando et al. .......................... 303/115

Primary Examiner—Douglas C. Butler
Attorney, Agent, or Firm—Scrivener, Clarke, Scrivener and Johnson

[57] ABSTRACT

An anti-skid braking system incorporates a modulator assembly through which fluid from a source is supplied to a brake. The modulator assembly comprises a de-boost piston working in a bore in a housing, an expander chamber connected to the brake and defined in the bore between one end of the piston and a first valve, and a second valve for controlling the application to the piston of support fluid to determine the relative position of the piston in the bore, the second valve being manipulated in response to a skid signal. The first valve is normally biassed in to a fully open position, and the operation of the first valve is controlled independently of the piston. An inhibit device is incorporated to ensure that at the termination of a skid signal first valve is maintained in a closed position at least until the piston has returned to an advanced position in which the effective volume of the expander chamber is at a minimum value.

24 Claims, 7 Drawing Figures

ANTI-SKID HYDRAULIC BRAKING SYSTEMS FOR VEHICLES

This invention relates to anti-skid hydraulic braking systems for vehicles of the kind in which hydraulic fluid from a source of hydraulic fluid under pressure is supplied to a wheel brake of a vehicle through a modulator assembly which is adapted to modulate the supply of fluid from the source to the brake in response to skid signals from skid sensing means, the modulator assembly comprising a de-boost piston working in a bore in a housing, an expander chamber connected to the brake and defined in the bore between one end of the piston and a first valve, the first valve being disposed between the source and the expander chamber, and a second valve for controlling the application to the boost piston of support fluid to determine the relative position of the piston in the bore, the second valve normally being so operative that the support fluid provides a biassing force for holding the piston in an advanced position in which the effective volume of the expander chamber is at a minimum value, and the first valve normally being open to provide communication between the source and the brake at least when the piston is in the said advanced position, and means responsive to a skid signal to manipulate the second valve in order to release the support fluid thereby reducing the biassing force whereafter the piston can move away from the advanced position and into a retracted position in which the effective volume of the expander chamber is increased thereby reducing the pressure applied to the brake.

In known anti-skid braking systems of the kind set forth operation of the first valve is controlled directly by the de-boost piston, conveniently by a mechanical connection, and the first valve is held in a fully open position against a valve biassing force when the piston is in its advanced position. The first valve is permitted to close as the de-boost piston retracts from its advanced position to reduce the pressure applied to the brake in response to the skid signal, and is held firmly closed by the difference in pressure between the brake and the source until such time as the de-boost piston has returned substantially to its advanced position, whereupon the pressure applied to the brake will be restored and the first valve will be re-opened. In such systems there is a danger that a failure in an auxiliary pressurised support system supplying the support fluid may permit the de-boost piston to retract in response to a relatively low brake pressure so that the first valve closes, thereby preventing the generation of adequate pressure in a line from the modulator assembly to the brake.

Known solutions to this problem include the use of a strong spring to bias the de-boost piston towards its advanced position to prevent the first valve from closing until adequate pressure has been applied to the brake, or the use of a normally-closed by-pass valve in parallel with the first valve and permitted to open only upon loss of adequate pressure in the auxiliary pressurised support system. Unfortunately a sufficiently strong spring tends to be unacceptably large and heavy, whilst by-pass valves are inherently unreliable.

In other known anti-skid braking systems both valves are solenoid-controlled in response to electrical skid signals and both valves are operated simultaneously. Thus, at the termination of a skid signal the first valve re-opens before the de-boost piston is able to return fully to its advanced position and a surge of pressure from the source to the brake may occur.

According to our invention in an anti-skid braking system of the kind set forth the first valve is normally biassed into a fully open position, and operation of the first valve is controlled independently of the de-boost piston, inhibit means being incorporated to ensure that at the termination of a skid signal the first valve is maintained in a closed position at least until the de-boost piston has returned to the advanced position.

This ensures that a failure in an auxiliary support system supplying the support fluid cannot cause isolation of the brake from the source, and also prevents premature opening of the first valve with consequent premature brake re-application at an uncontrolled rate.

Operation of the first valve is independent of the de-boost piston and there is no mechanical connection therebetween. However operation of the first valve following termination of a skid signal is dependent upon position sensing means responsive to the position of the de-boost piston in its bore for over-riding the inhibit means.

A cut-off valve may be provided between the source and the brake, and such a valve is held open by the de-boost piston when the de-boost piston is in the fully open position, the first valve controlling communication between the source and the brake through a by-pass passage which by-passes the cut-off valve, and the first valve being adapted to open upon failure of the de-boost piston, at the termination of the skid signal, to return to the advanced position.

The postion sensing means may sense the position of the de-boost piston directly, for example by means of an electrical switch, or indirectly for example by flow-sensing means associated with the support chamber.

The support fluid may comprise a supply of hydraulic fluid, or it may be pneumatic, suitably air.

The support fluid may be supplied to a signal support chamber, or to a plurality of support chambers which are separated by faces on the piston of different areas whereby to bias the piston between its advanced and retracted positions.

When the support fluid is hydraulic the support fluid may be supplied to a single support chamber by an hydraulic pump which is controlled by the generation of a skid signal. In such a construction the second valve normally closes communication between the support chamber and a reservoir, from which the pump draws hydraulic fluid, but, in response to a skid signal, the second valve opens to release the support fluid from the support chamber to the reservoir simultaneously with the pump being operated to pump the support fluid in a closed circuit through the support chamber with the pump continuing to operate after closure of the second valve at the termination of the skid signal in order to repressurise the support chamber whereby to return the de-boost piston to the advanced position at a rate determined by the pump, at which point the first valve re-opens and the pump ceases to operate.

In another construction hydraulic support fluid may be supplied to the support chamber from an hydraulic accumulator either directly or through a flow-control regulating valve.

In the former case the return to the reservoir from one of the support chambers may be controlled by a flow-control regulating valve so that brake re-application takes place at a controlled rate, determined by the flow rate permitted by the regulating valve. Alternatively the return movement of the de-boost piston may be controlled by the transfer of fluid from one support chamber to another support chamber via the regulating valve.

In the latter case in which the supply is through a flow-control regulating valve the second valve normally closes communication between the support chamber and a reservoir from which the accumulator is charged with hydraulic pressure fluid, and the support chamber is pressurised to hold the de-boost piston in its advanced position by pressure fluid supplied to the support chamber through the regulating valve. In response to a skid signal the second valve opens to release the support fluid from the support chamber to the reservoir, and, at the termination of the skid signal, the accumulator replenishes the support chamber at a rate determined by the regulating valve.

The first valve can be operated in response to the skid signal independently of operation of the second valve in response to the skid signal.

In a modification, however, operation of the first valve can be sequentially controlled with operation of the second valve by means of the flow-control regulating valve itself. This is achieved by providing a spring-loaded coupling between the flow-control regulating valve and the first valve, which coupling is constructed and arranged to open the first valve, or to hold the first valve open, when no fluid is flowing through the flow control regulating valve.

The flow control regulating valve and the de-boost piston may be arranged in interconnected spaced bores in a common housing but, preferably, they are both arranged in a common bore.

When two support chambers are provided the second valve may be arranged, in its normal operative position, to subject enlarged opposed faces of the de-boost piston to differential pressures, whereby to hold the piston in the advanced position with such pressures being equalised in response to a skid signal so that the de-boost piston is permitted to move into the retracted position, the differential pressures being re-established at the termination of the skid signal. This arrangement is particularly suitable for use with a pneumatic support fluid.

Conveniently the de-boost piston is held in its advanced position by vacuum acting on one of the said opposed faces with the other of the said opposed faces being subjected to atmospheric air, the two faces being interconnected in response to the skid signal.

When the first valve is operated electrically independently of the second valve in response to the skid signal, a switch is operated by the de-boost piston to cause the first valve to re-open only when the de-boost piston has returned to its advanced position.

When operation of the first valve is controlled by the flow-control regulating valve the position sensing means comprises the flow-control regulating valve itself in combination with a spring which is operative to open the first valve when no fluid is flowing through the flow-control regulating valve.

Some embodiments of our invention are illustrated in the accompanying drawings in which.

Figure 1:
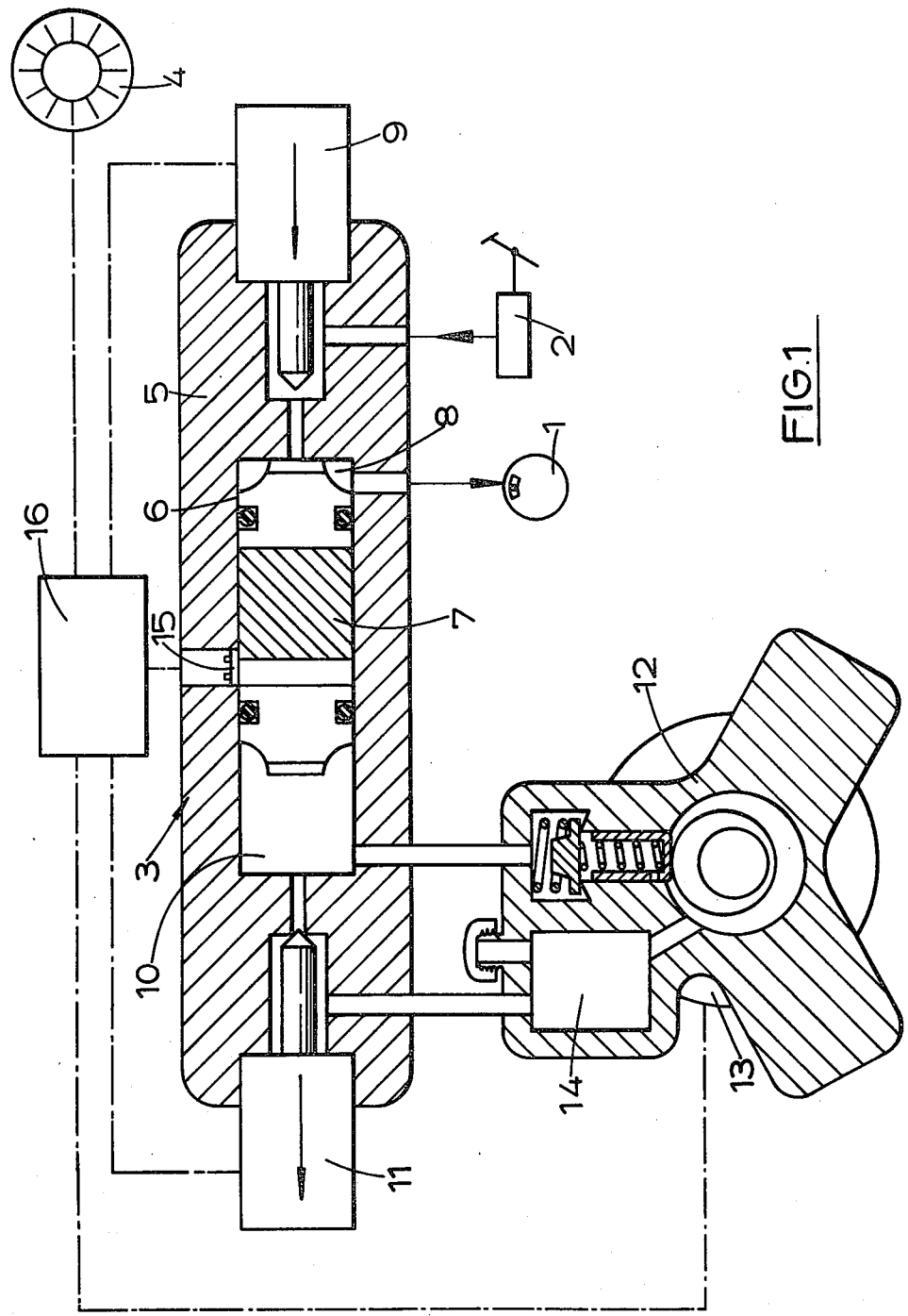
FIG. 1 is a layout of a first anti-skid hydraulic braking system.

In the anti-skid braking system illustrated in FIG. 1 of the accompanying drawings a wheel brake 1 is adapted to be applied by a pedal-operated master cylinder 2 through a modulator assembly 3 which is responsive to skid signals from a sensor 4 for sensing the speed of rotation of the wheel braked by brake 1.

The modulator assembly 3 comprises a housing 5 having a longitudinally extending bore 6 in which works a de-boost piston 7, an expander chamber 8 defined in the bore 6 between one end of the piston 7 and a first solenoid-operated valve 9 for controlling communication from the master cylinder 2 to the brake 1 through the expander chamber 8, and a support chamber 10 defined in the bore 6 between the opposite end of the piston 7 and a second solenoid-operated valve 11.

An hydraulic pump 12 driven by an electric motor 13 has an output connected to the support chamber 10, and the second valve 11 controls communication between the support chamber 10 and a reservoir 14 from which the pump 12 draws fluid for supply to the support chamber 10.

An electronic switch 15 senses the position of the piston 7 in the bore 6, and an electronic controller 16 is operative to control sequential energisation of the solenoids of the two valves 9 and 11, and of the electric motor 13 in response to skid signals from the sensor 4, and signals from the electronic switch 15.

In a normal inoperative position shown in the drawing the valve 9 is open, the valve 11 is closed, the electronic switch has an "off" status, and the piston 7 is held in an advanced position in engagement with a stop at the adjacent end of the bore 6 and in which the volume of the expander chamber 8 is at a minimum, by means of a volume of support fluid which is trapped in the support chamber 10 between a one-way valve 17 at the outlet from the pump 12 and the closed valve 11. Thus, although the pressure from the brake 1 acts on the piston 7, the piston 7 is prevented from moving because of the trapped volume of hydraulic fluid.

For normal brake operation, fluid from the master cylinder 2 is supplied to the brake 1 through the open valve 9 and the expander chamber 8.

Should the pressure applied to the brake 1 cause the sensor 4 to emit a skid signal, in response to such a skid signal the controller 16 energises both solenoid-operated valves 9 and 11 simultaneously to close the valve 9 which isolates the master cylinder 2 from the brake 1, and opens the valve 11 to connect the support chamber 10 to the reservoir 14. This latter action causes the de-boost piston 7 to move rapidly along the bore 6, as a result of brake pressure acting on it, in turn to increase the effective volume of the expander chamber 8, thereby relieving the pressure applied to the brake 1. At the same time the electronic switch 15 is actuated by the piston 7 which adopts an "on" status to provide the controller 16 with a signal which causes the controller 16 to start the motor 13, and hold the solenoid valve 9 in its closed position.

The motor 13 drives the pump 12 to draw fluid from the reservoir 14 and pump it in a closed circuit through the support chamber 10 from whence it returns to the reservoir 14.

At the termination of the skid signal the controller 16 cuts-off the energising current to the solenoid of the valve 11 so that valve 11 closes, and the de-boost piston 7 is forced back along the bore 6 to reduce progressively the effective volume of the expander chamber 8 and re-apply the brake 1 at a rate proportional to the speed of rotation of the electric motor 13. When the piston 7 re-engages with its stop in its advanced position the electronic switch 15 is restored to the "off" status to cancel its signal to the controller 16, which, in turn, cancels the energising current to the motor 13 and to the solenoid of the valve 9. The pump 12 stops pumping so that the piston 7 is again held in the advanced position by fluid trapped in the support chamber 10 by the one-way valve 17, and the valve 9 opens to re-connect the master cylinder 2 to the brake 1. The system is thus restored to the inoperative position described above and as illustrated in the drawing.

Should a second or further skid occur before the de-boost piston 7 reaches its stop, the solenoid-operated valve 11 is re-opened and the cycle described above is repeated.

Should a failure of the motor 13, controller 16, sensor 4, solenoid-operated valve 11 or pump 12 occur, the solenoid-operated valve 9 remains open and cannot be energised. This enables the brake 1 to be applied freely. Should one of the above-mentioned failures occur during anti-lock cycling, the valve 9 will be re-opened after a predetermined time interval.

When the modulator assembly 3 is first installed in a vehicle the support chamber 10 will contain air. As the brake 1 is applied the de-boost piston 7 will move away from the stop in response to pressure from the master cylinder 2 and will activate the switch 15 to cause the controller 16 to energise the motor 13 and start the pump 12. This introduces hydraulic fluid into the support chamber 10. When the pressure in the support chamber 10 exceeds the pressure applied to the brake the piston 7 moves back to re-engage with its stop and activate the switch 15 to cause the controller 16 to switch off the motor 13. When the brake is released the de-boost piston 7 will be held hard against its stop by the pressurised mixture of air and hydraulic fluid in the support chamber 10. However, after a few skid cycles with the valve 11 opening and closing, the fluid in the support chamber will be replenished with fresh non-gaseous hydraulic fluid.

Figure 2:
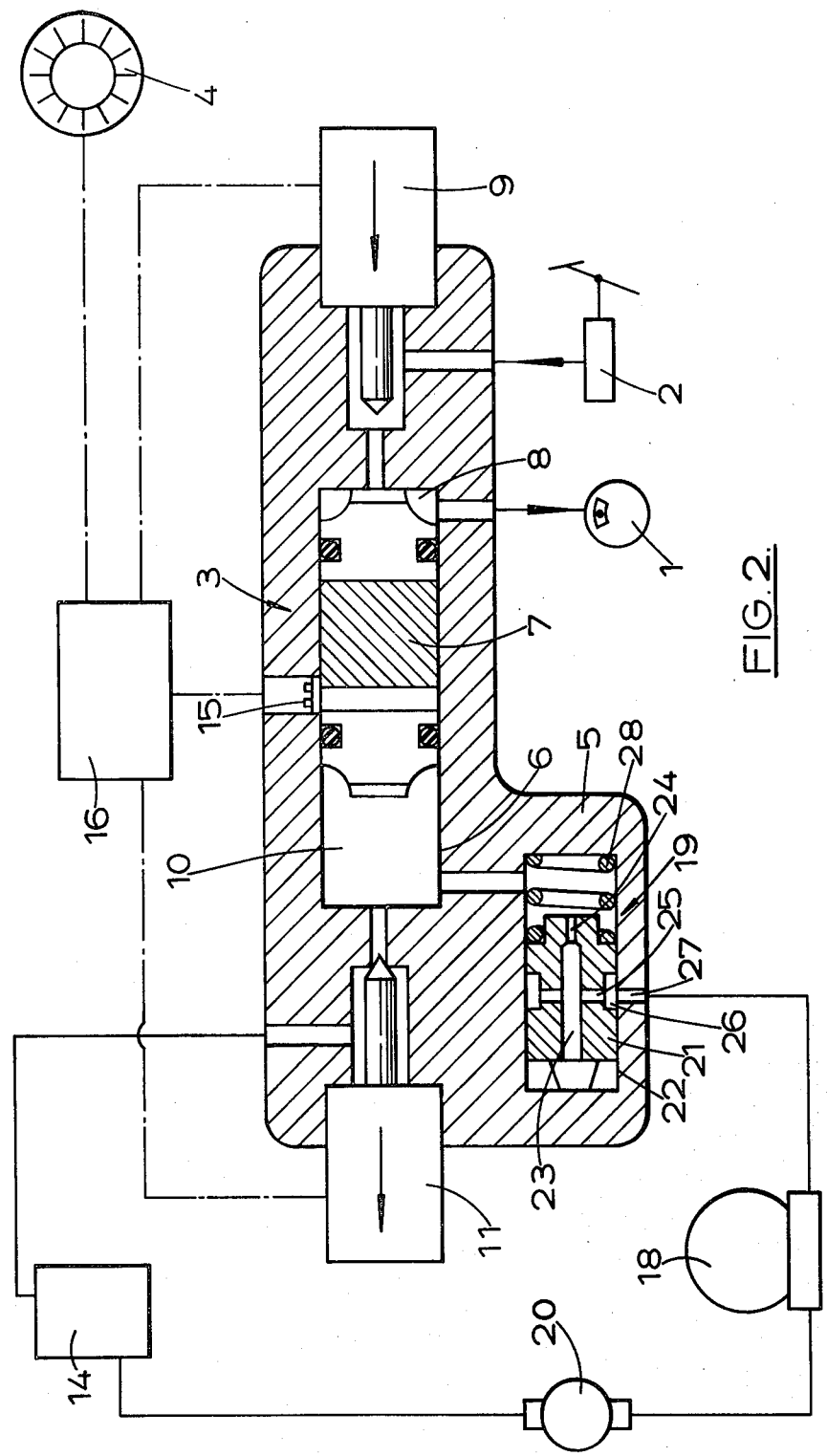
FIG. 2 is a layout similar to FIG. 1 but showing a modification.

In the modified braking system shown in the layout of FIG. 2 the power source constituted by the pump 12 and the motor 13 is replaced by an hydraulic accumulator 18 and a fluid flow control regulating valve 19, which is disposed between the accumulator 18 and the support chamber 10. The accumulator 18 is charged by a pump 20 which, in turn, draws fluid from the reservoir 14 which, in the layout illustrated, is separate from the pump 20.

The flow-control regulating valve 19 comprise a spool 21 which works in a bore 22 in the housing 5 and is provided with a through-bore 23 terminating at its inner end adjacent to the support chamber 10 in a fixed orifice 24. A diametrical passage 25 traverses the bore 23 and its outer ends lead into an annular groove 26 which co-operates with a radial port 27 leading from the accumulator 18 to constitute a variable restrictor. In the position shown in the drawing the spool 21 is held by a spring 28 in a position of maximum flow.

In the position shown in the drawing the de-boost piston 7 is held in its advanced position for normal brake application by fluid pressure trapped in the support chamber 10 by the accumulator 18 and the braking sequence is generally as described above.

During a skid cycle however, fluid from the accumulator 18 flows into the support chamber 10, at a rate determined by the flow-control regulating valve 19 in accordance with the pressure drop across the orifice 24 and the load in the spring 28, to force the piston 7 to return to the advanced position and re-apply the brake 1. If the road surface permits a complete return of piston 7 to its advanced position the switch 15 is activated to permit the solenoid-operated valve 9 to open and re-connect the master cylinder 2 to the brake 1.

Should the accumulator pressure fall too low as sensed by a switch (not shown), or should the controller 16, or the sensor 4, fail, the solenoid-operated valve 9 opens to allow the master cylinder 2 to be re-connected to the brake 1, whereafter the brake 1 can be applied.

The construction and operation of the braking system of FIG. 2 is otherwise the same as that of FIG. 1 and corresponding reference numerals have been applied to corresponding parts.

Figure 3:
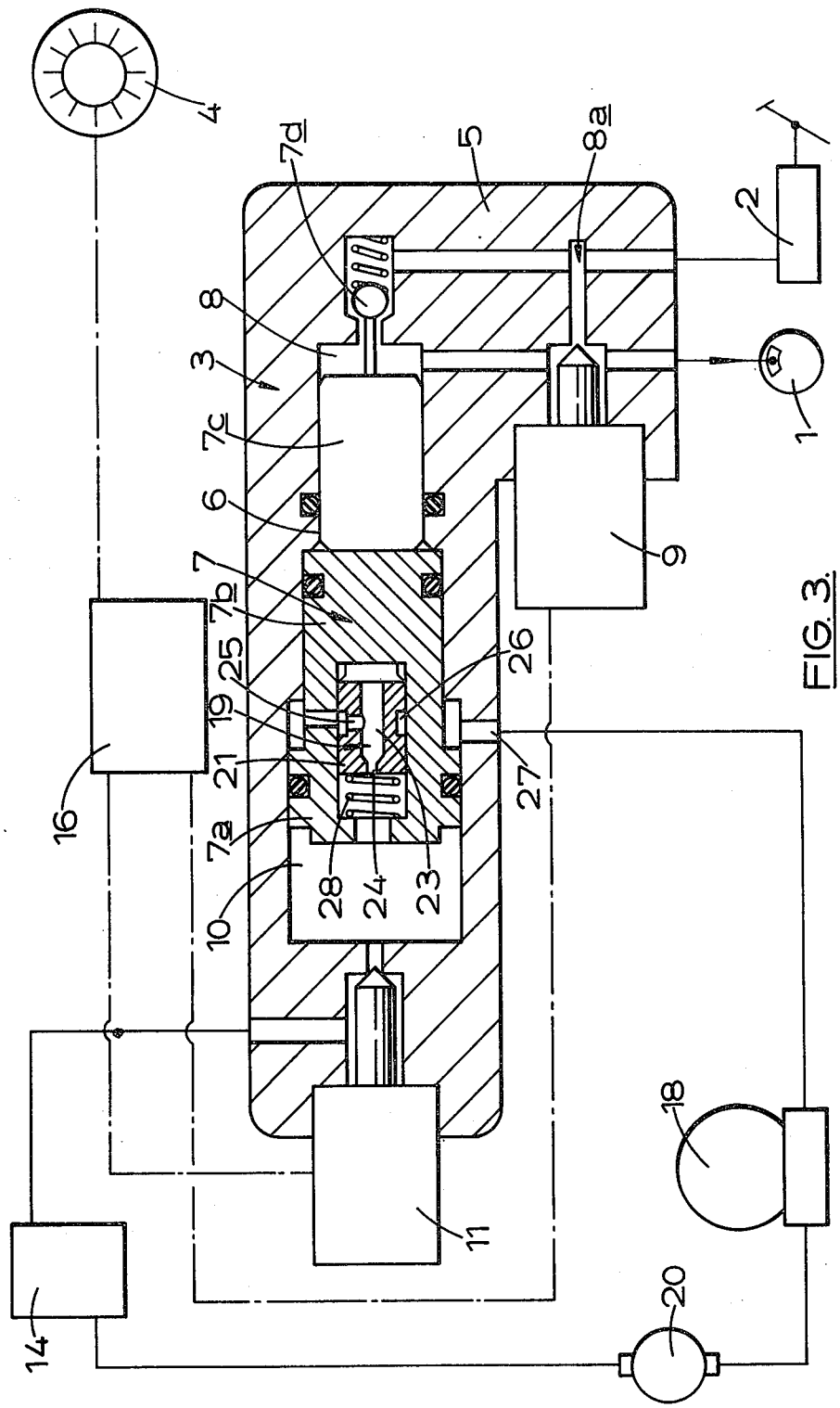
FIG. 3 is a layout similar to FIG. 2 but showing a modification.

In the braking system illustrated in the layout of FIG. 3 the switch 15 is omitted and the flow-control regulating valve 19 is incorporated in the de-boost piston 7 with the bore 22 in which the spool 21 works comprising a blind bore in the piston 7 which opens into the chamber 10. The piston 7 is of stepped outline comprising portions 7a 7b and 7c of greatest, intermediate, and smallest diameter, working in complementary portions of the bore 6. The piston 7c, which may be separate from the piston portions 7a and 7b, co-operates with a spring-loaded out-off valve 7d for controlling communication between the master cylinder 2 and the brake 1, through complementary passages in the housing 5 and the expander chamber 8. A by-pass passage 8a by-passing the valve 7d provides communication between the master cylinder 2 and brake 1 when the cut-off valve 7d is closed and the solenoid-operated valve 9 is open.

In the inoperative position shown in the drawing, the solenoid-operated valve 11 is closed so that the piston 7 is held in its advanced position by fluid trapped in the support chamber 10 with the piston 7 holding the cut-off valve 7d in an open position, and the solenoid-operated valve 9 is open. It follows, therefore, that the master cylinder 2 is in communication with the brake 1 through both the expander chamber 8 and the by-pass passage 8a.

When a skid signal is emitted the controller 16 energises both solenoid-operated valves 9 and 11 to close the valve 9 which isolates the master cylinder 2 from the brake through the by-pass passage 8a, and opens the valve 11 to connect the support chamber 10 to the reservoir 14. This latter action causes the de-boost piston 7 to move rapidly along the bore 6, as a result of brake pressure acting on it, in turn to permit the by-pass valve 7d to close to isolate the expander chamber 8 from the master cylinder 2 and to increase the effective volume of the chamber 8 to relieve the pressure applied to the brake 1.

At the termination of the skid signal the controller 16 cuts-off the energising current to the solenoid of the valve 11 so that the valve closes, and the de-boost piston 7 is normally forced back along the bore 6 to reduce progressively the effective volume of the expander chamber 8 and re-apply the brake 1 at a rate determined by the flow into the support chamber 10 of fluid from the accumulator 18 at a rate determined by the pressure drop across the orifice 24 and the load in the spring 28, until in its advanced position, the valve 7d opens to re-connect the master cylinder 2 to the brake. During this period the solenoid-operated valve 9 remains closed and normally the solenoid of that valve is de-energised to enable the valve 9 to open, only after the valve 7d has opened when the de-boost piston is in its advanced position. However, if after initiating movement of the de-boost piston 7 in a direction to re-apply the brake 2, the pressure from the accumulator should fail for any reason making it impossible to increase the pressure in the chamber 10 further, or should the valve 11 stick in the open position making it impossible to move the de-boost piston 7 in a brake re-applying direction, then the controller 16 is operative to de-energise the solenoid of the valve 9 so that the valve 9 opens to re-connect the master cylinder 2 to the brake 1 through the by-pass passage 8a.

The provision of the by-pass passage 8a controlled by the valve 9 ensures that at the termination of a skid signal the brake 1 can be re-applied upon failure of the means for moving the de-boost piston 7 in a brake re-applying direction, or for maintaining it in a brake applying position with the valve 7d held open.

The construction and operation of a braking system of FIG. 3 is otherwise the same of that of FIG. 2 and corresponding reference numerals have been applied to corresponding parts.

Figure 4:
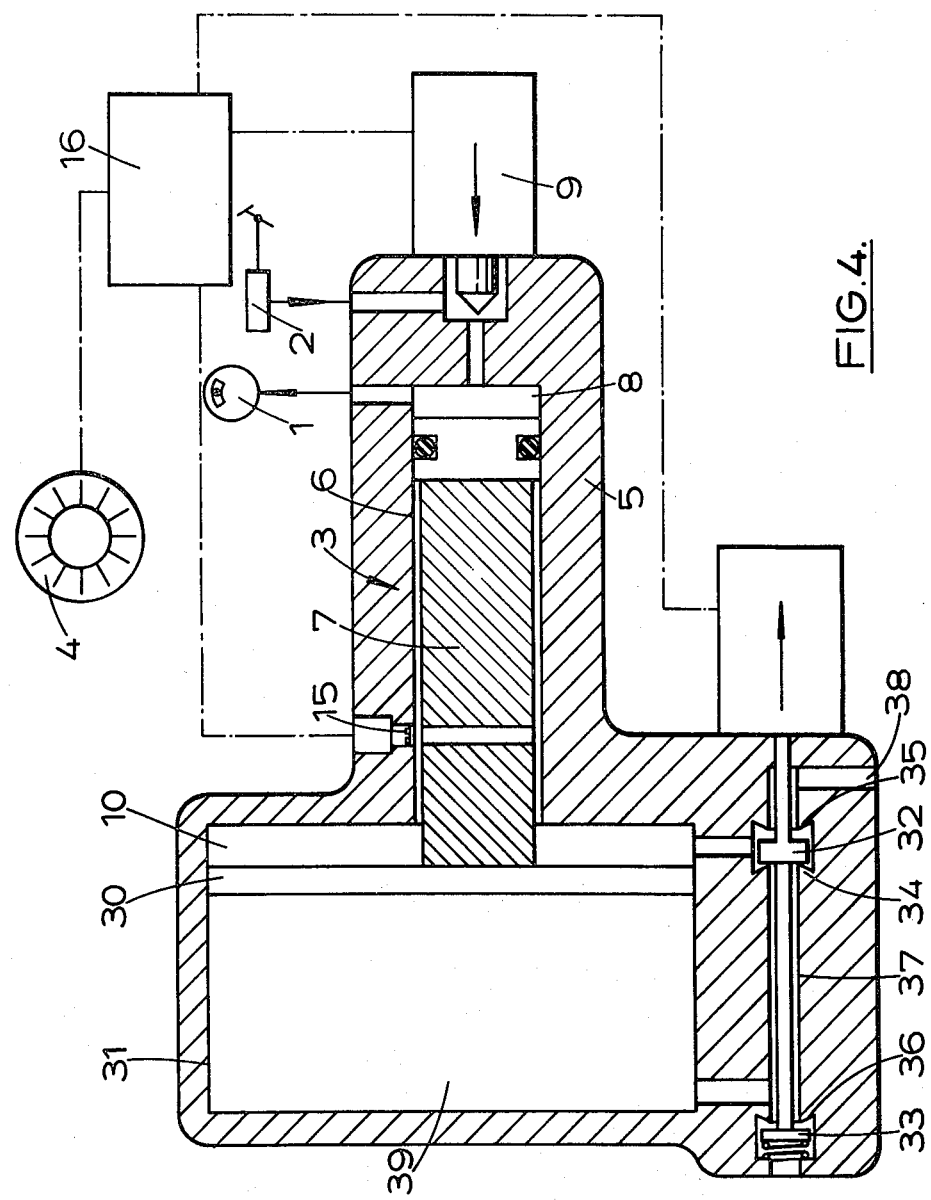
FIG. 4 is a layout of another anti-skid hydraulic braking system.

In the braking system illustrated in the layout of FIG. 4 the power source is constituted by pneumatic pressure, suitably a source of vacuum, for example a connection to the manifold of the engine of the vehicle, and the de-boost piston 7 is adapted for modulation by such a source.

As illustrated in the drawings the end of the piston 7 remote from the expander chamber 8 is carried by an integral wall 30 of substantial diameter and which works in a portion 31 of the bore 6 which is of similarly increased diameter.

The support chamber 10 is defined between the inner face of the wall 30 and the portion of the bore 6 which leads to the expander chamber 8.

The solenoid-operated valve 11 has a valve member provided with spaced inlet and exhaust heads 32 and 33 of which the inlet head 32 is alternately engageable with one of a pair of spaced seatings 34, 35 and the exhaust head 33 is engageable with a seating 36. The pair of seatings 34, 35, and the seating 36, are located at opposite ends of a passage 37 in the housing which interconnects the support chamber 10.

When the valve 11 is de-energized in a "closed" position, the head 32 is in engagement with the seating 34 and is spaced from the seating 35 so that communication between opposite sides of the wall 30 through the passage 37 is prevented, and vacuum is supplied to the support chamber 10 from a connection 38 leading through the seating 35. The head 33 is spaced from the seating 36 so that a second support chamber 10a, defined in the portion 31 of the bore which is between the outer face of the wall 30 and the end of the housing 5 remote from the support chamber 10, is in communication with atmosphere. Subjecting the inner face of the wall 30 to vacuum holds the de-boost piston 7 in its advanced position in which the effective volume of the expander chamber 8 is at a minimum.

When a skid signal is generated and the solenoids of both valves 9 and 11 are energised with the valve 9 closing, the valve 11 also moves into an "open" position with the head 32 moving out of engagement with the seating 34 and into engagement with the seating 35, and the head 33 engaging with the seating 36. This isolates the support chamber 10 from the source of a vacuum and interconnects the two support chambers 10 and 10a to equalise the differential pressures. The de-boost piston 7 can then retract to activate the electronic switch 15 and relieve the pressure applied to the brake 1.

At the termination of the skid signal the valve 11 closes and the differential pressures acting on the wall 30 are re-established to return the piston 7 towards, or into, its advanced position at a rate determined by the vacuum supply.

The construction and operation of the system of FIG. 4 is otherwise the same as that of FIGS. 1-3 and corresponding reference numerals have been applied to corresponding parts.

Figure 5:
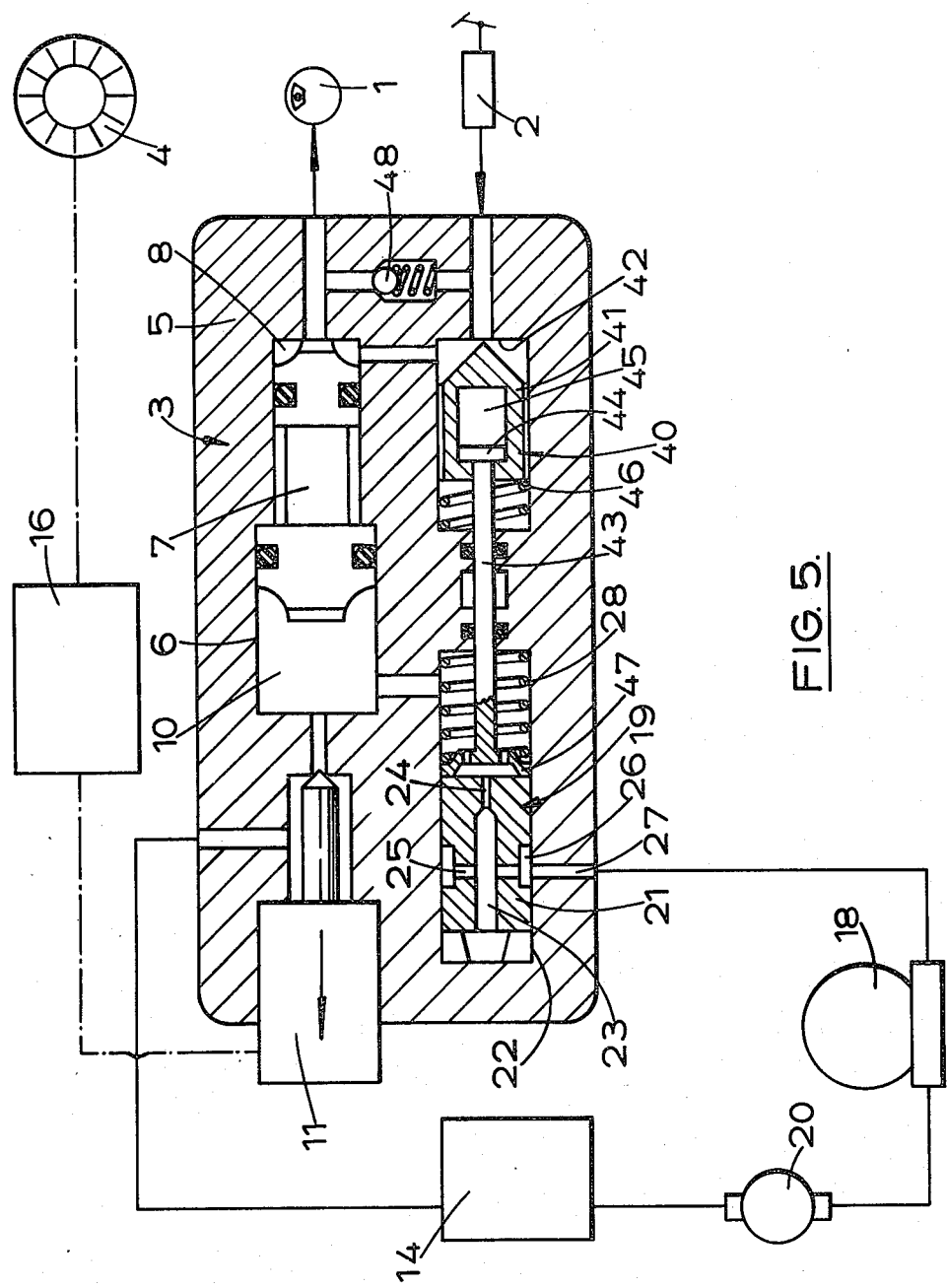
FIG. 5 is a layout of yet another anti-skid hydraulic braking system.

The anti-skid braking system of FIG. 5 is similar to the system shown in the layout of FIG. 3.

In the system of FIG. 5 the electronic switch 15 and the solenoid-operated valve 9 have been omitted, and the de-boost piston 7 is shown of differential outline and works in the bore 6 which is correspondingly stepped, the end of smaller area constituting a part of the expander chamber 8.

A cut-off valve 40 between the master cylinder and the expander chamber 8 comprises a valve member 41 for engagement with a seating 42 and which is coupled to an axially extending stem 43 through a lost-motion coupling constructed by a head 44 slidably guided in a slot 45 in the valve member 41. A spring 46 having a load less than that of the spring 28 normally urges the valve member 41 into engagement with the head 44. The opposite end of the stem 43 has an enlarged-apertured head 47 which is urged by the spring 28 into engagement with the adjacent end of the spool 21 of the flow-control regulating valve 19 in which the fixed orifice 24 is provided. This in turn, acts to hold the spool 21 in a retracted position and the valve member 41 away from the seating 42.

A one-way valve 48 permits fluid supplied to the brake 1 to return to the master cylinder 2.

In the position shown in the drawing the valve 11 is closed and the valve 40 is open to allow the brake 1 to be applied normally from the master cylinder and with the de-boost piston 7 held in the advanced position by pressure from the accumulator 18 supplied to its end of greater area through the flow-control regulating valve 19.

When a skid signal is generated the solenoid-operated valve 11 opens to place the support chamber 10 in communication with the reservoir 14. Due to a pressure drop across the fixed orifice 24, the spool 21 moves rapidly away from its retracted position, and into an advanced flow-regulating position, to cause the valve member 41 to engage with the seating 42 and isolate the master cylinder 2 from the brake 1.

The loss of pressure in the support chamber 10 permits the de-boost piston 7 to retract, thereby relieving the brake-applying pressure.

At the termination of the skid signal when the valve 11 closes to isolate the support chamber 10 from the reservoir 14 and fluid from the accumulator 18 returns the de-boost piston 7 at a rate determined by the flow-control regulating valve 19 to re-apply the brake 1, the valve member 41 remains in engagement with the seating 42 since the spool 21 is still in the advanced position.

When the piston 7 reaches its advanced position the flow of fluid through the flow-control regulator valve 19 ceases, equalising the pressure at opposite ends of the spool 21 which then moves back into its retracted position due to the load in the spring 28, thus re-opening the valve 40 to re-establish communication between the master cylinder 2 and the brake 1 through the expander chamber 8.

Should the accumulator 18 fail during a skid cycle the pressure across the flow-control regulating valve 19 will equalise and the valve 40 will open. This will allow the brake pressure to rise and re-apply the brake 1. Such an increase in brake pressure will not move the de-boost piston 7 due to the provision of a one-way valve (not shown) at the outlet from the accumulator 18.

The flow through the flow-control regulating valve 19 is determined by the force in the spring 28 and this force, divided by the area of the spool 21, determines the pressure drop across the orifice 24.

However, if the mean brake-applying pressure is high, it acts on the stem 43 through the valve member 41. This increases the force acting on the flow-control regulating valve 19 to give an increased rate of brake re-application. A low mean brake-applying pressure reduces this force and gives a slower rate of brake re-application.

The construction and operation of the system of FIG. 5 is otherwise the same as that of FIG. 2 and corresponding reference numerals have been applied to corresponding parts.

Figure 6:
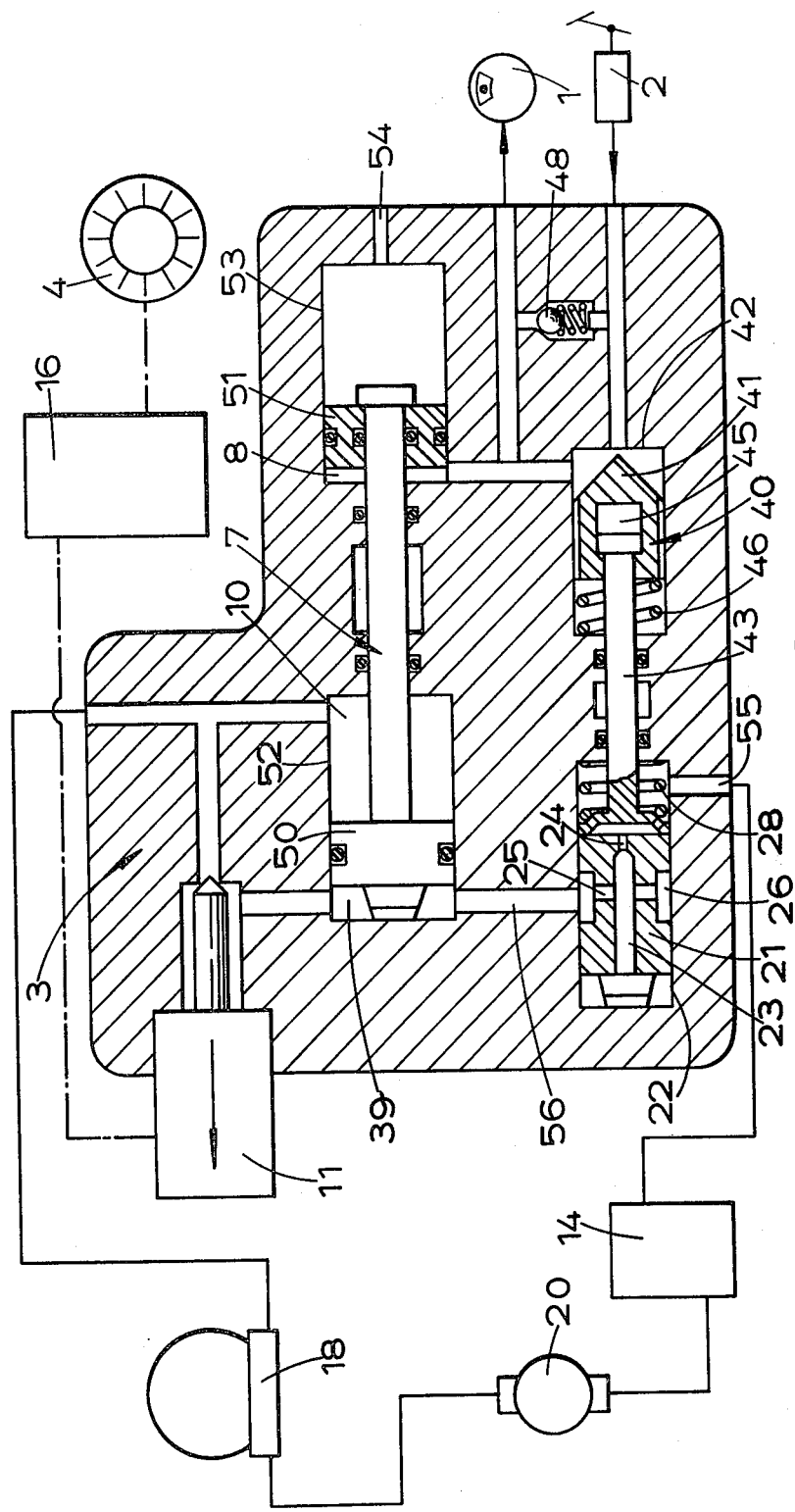
FIG. 6 is a layout similar of FIG. 4 but showing a modification.

In the anti-skid braking system illustrated in FIG. 6 the de-boost piston 7 comprises two relatively movable parts 50 and 51 which work in different and separate bore portions 52 and 53 in the housing 5. The expander chamber 8 is defined between the piston 51 and the inner end of the bore 53 of which the outer end is vented to atmosphere through a port 54, and the support chamber 10 is defined between the piston part 50 and the inner end of the bore portion 52. The support chamber 10a is defined between the piston part 50 and the outer end of the bore portion 52. The accumulator 18 is connected directly to the support chamber 10, and the reservoir 14 is connected to a passage 55 leading to that end of the bore 22 in which the spring 28 is housed.

In the inoperative position shown in the drawing in which the brake 1 can be applied normally from the master cylinder 2 through the expander chamber 8, the de-boost piston 7 is held in its advanced position by pressure from the accumulator 18 which is trapped in the support chamber 10 by the closed solenoid-operated valve 11, and the valve member 41 is held away from the seating 42 only by the difference between the loads in the springs 46 and 28 since the flow-control regulating valve 19 is only connected to the reservoir 14 which is at atmospheric pressure.

When a skid signal is generated and the valve 11 opens the support chambers 10 and 10a are interconnected and placed in communication with the groove 26 in the spool 21 of the flow-control regulating valve 19 through a by-pass passage 56. This causes pressure from the accumulator 18 to be applied to the outer end of the spool 21. This, in turn, causes a pressure difference to be established across the spool 21 which moves it to be established across the spool 21 which moves it against the force in the spring 28 to cause the valve member 41 to engage with its seating 42, thereby isolating the master cylinder 2 from the brake 1. Meanwhile the piston 7 is driven along its bore with the piston portion 51 following movement of the piston portion 50 towards the outer end of the bore portion 53 in order to increase the effective volume of the expander chamber 8, thereby relieving the brake-applying pressure.

At the termination of the skid signal the valve 11 closes to isolate the flow-control regulating valve 19 from the accumulator 18. Fluid in the passage 56 and the support chamber 10a is returned to the reservoir 14 through the flow-control regulating valve 19 at a rate determined by the fixed orifice 24 which, in turn, determines the rate at which the de-boost piston 7 can be returned to its advanced position in response to pressurized fluid from the accumulator 18 supplied to the support chamber 10. The piston portion 51 is picked up by the piston portion 50 during its return movement.

After the piston portion 50 has returned to its initial position the pressures acting on the spool 21 equalise as the flow through the valve 19 ceases. This permits the spring 28 to return the spool 21 to its initial position thereby withdrawing the valve member 41 from it seating 42.

Should the accumulator fail during a skid cycle, the pressures acting across the spool 21 will equalise, and the valve 40 will open to enable the brake 1 to be re-applied.

The construction and operation of the system of FIG. 6 is otherwise the same as that of FIG. 5 and corresponding reference numerals have again been applied to corresponding parts.

Figure 7:
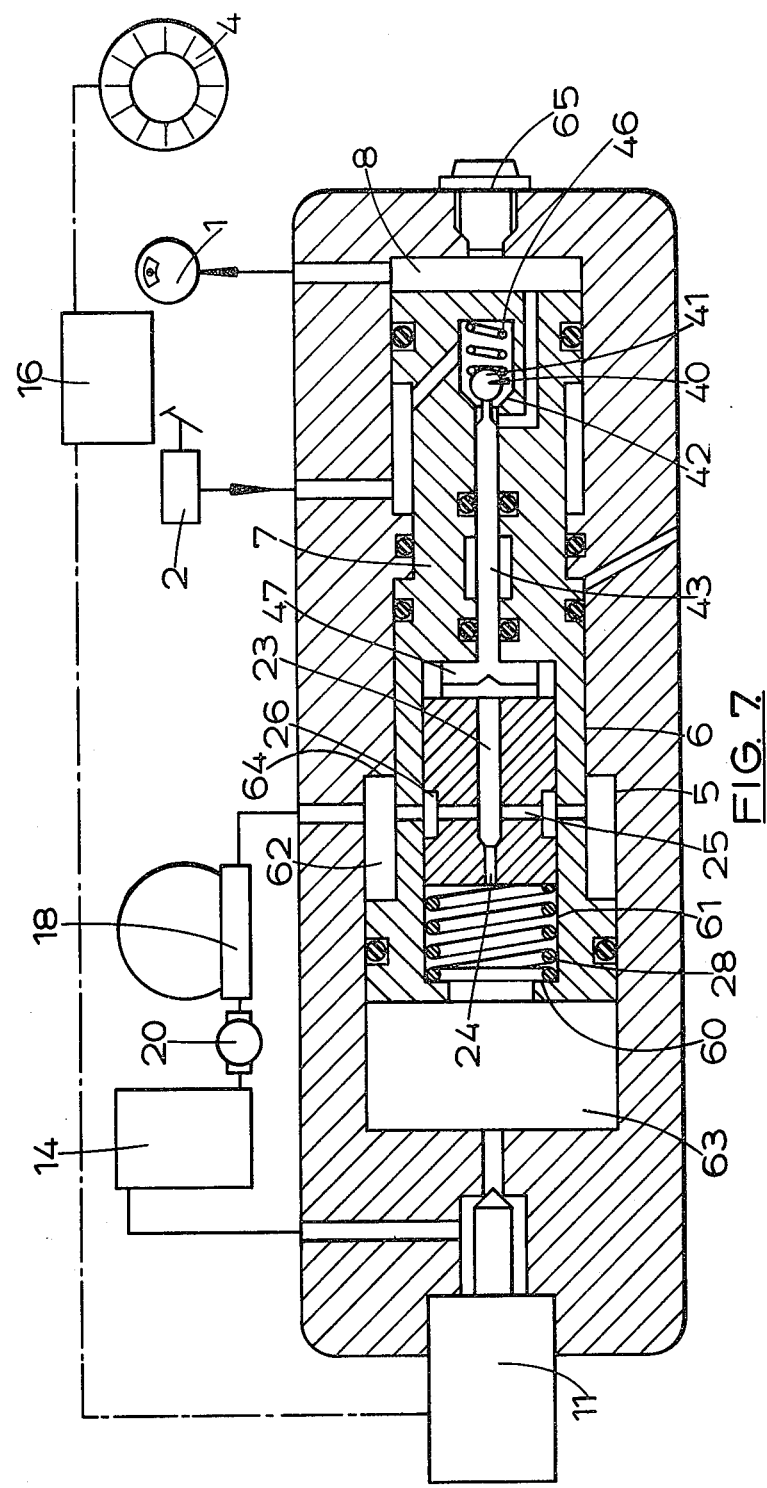
FIG. 7 is a layout of another anti-skid hydraulic braking system.

In the layout shown in FIG. 7 the de-boost piston 7 is of stepped outline and of integral construction, and the flow-control regulating valve 19 and the cut-off valve 40 are embodied in the de-boost piston 7 itself so that all the movable components of the modulator assembly 3 are accommodated within, or co-operate with, parts of a single bore 6 in the housing 5. This facilitates construction, manufacture, and assembly.

In this construction, however, the seating 42 of the cut-off valve 40 is provided in the de-boost piston 7, and the valve member 41 is separate from the stem 43 and is constituted by a ball. The ball 41 is normally held away from the seating 42 by the spring 28, which acts on the stem 43 through the spool 21 and, at its outer end, abuts against a shoulder 60 at the end of the piston 7 adjacent to the solenoid-operated valve 11. The position of the spool 22 is reversed and the spool 22 works in a portion of a stepped bore 61 in the piston 7, the stem 43 being guided to slide in a portion of the bore 61 which is of reduced diameter.

Support chambers 62 and 63 are defined by portions of the bore 6 on opposite sides of a shoulder 64 at the end of the piston 7 which is of greater area.

When the valve 11 is closed, the piston 7 is held in its advanced position by the pressure in the accumulator 18 which acts through the flow-control regulating valve 19 so that equal pressures are present in the chambers 62 and 63. Due to the difference in the areas of opposite sides of shoulder 64 the piston 7 is subjected to net force which holds it away from the chamber 63.

When a skid signal is generated the valve 11 opens and the chamber 63 is placed in communication with the reservoir 11. Due to the pressure drop across the fixed orifice 24, since accumulator pressure is still applied to the chamber 62, the spool 22 retracts against the load in the spring 28 to permit the ball 41 to engage with the seating 42 and the piston 7 itself retracts to increase the effective volume of the expander chamber 8 and relieve the pressure applied to the brake 1.

During this movement a slight reaction or feed-back will be felt on the pedal due to the entering volume of the retracting free end of the piston 7.

Whilst the skid signal is operative both the spool 22 and the piston 7 are held in their extreme retracted positions due to the pressure drop across the flow-control regulating valve 19.

At the termination of the skid signal the valve 11 closes to permit the pressure in the chamber 63 to increase thereby permitting the de-boost piston 7 to return, in a controlled manner, to its advanced position, thus re-applying the brake 1 gradually. When the piston 7 has returned to its fully advanced position these pressures are substantially equalised and the spool 22 can then move in a corresponding direction under the force in the spring 28 to re-open the valve 40.

Should the pressure applied to the brake 1 fall below a predetermined minimum value, say 30 p.s.i., then a pressure switch 65 may be provided to close the valve 11 so that the brake-applying pressure can be increased in a subsequent sequence as described above.

The construction and operation of the system of FIG. 7 is otherwise the same as that of FIG. 6 and corresponding reference numerals have been applied to corresponding parts.

In the embodiment described above with reference to FIG. 7, when the vehicle is travelling over a surface having a low coefficient of friction, after the solenoid of the valve 11 has been energised for a period determined by the controller 16, we may arrange for the solenoid to be pulsed subsequently to impart a re-application process at intervals in order to modify the effective brake re-application rate, for example to reduce the rate at which brake re-application pressure can increase.

I claim:

1. An anti-skid hydraulic braking system for vehicles comprising a wheel brake, a source of hydraulic fluid under pressure for applying said brake, skid sensing means for emitting skid signals responsive to behaviour of said wheel when said brake is applied, a modulator assembly for modulating the supply of fluid from said source to said brake in response to said skid signals from said skid sensing means, said modulator assembly comprising a housing having a bore, a de-boost piston working in said bore, a first valve, means in said housing defining an expander chamber between an end of said de-boost piston and said first valve, said first valve being disposed between said source and said expander chamber, means in said housing defining a support chamber to which said de-boost piston is subjected, and a second valve for controlling application to said de-boost piston of support fluid in said support chamber to determine the relative position of said de-boost piston in said bore, said support fluid normally being adapted to provide a biassing force for holding said de-boost piston in an advanced position in which the effective volume of said expander piston is at a minimum value, and said first valve being movable between an open position at least when said de-boost piston is in said advanced position and a closed position when said de-boost piston is displaced from said advanced position and into a retracted position, and means responsive to a skid signal to manipulate said second valve in order to release said support fluid thereby reducing said biassing force whereafter said piston can move away from said advanced position and into said retracted position in which said effective volume of said expander chamber is increased thereby reducing said pressure of fluid applied to said brake, wherein means are provided for normally biassing said first valve into a fully open position, and operation of said first valve is controlled independently of the de-boost piston, inhibit means being incorporated to ensure that at the termination of a skid signal said first valve is maintained in a closed position at least until said de-boost piston has returned to said advanced position.

2. A system as claimed in claim 1, wherein position sensing means responsive to the position of said de-boost piston in said bore are adapted to over-ride said inhibit means, and operation of said first valve following termination of a skid signal is dependent upon said position sensing means.

3. A system as claimed in claim 2, wherein position sensing means is adapted to sense the position of said de-boost piston directly.

4. A system as claimed in claim 3, wherein said position sensing means comprises an electrical switch.

5. A system as claimed in claim 3, wherein said position sensing means is adapted to sense the position of the de-boost piston indirectly.

6. A system as claimed in claim 5, including flow-sensing means associated with said support chamber for sensing the position of said de-boost piston indirectly.

7. A system as claimed in claim 1, wherein a cut-off valve between said source and said brake is adapted to be held open by said de-boost piston when said de-boost piston is in said advanced position, and said first valve controls communication between said source and said brake through a by-pass passage which by-passes said cut-off valve, said first valve being adapted to open upon failure of said de-boost piston, at the termination of said skid signal, to return to said advanced position.

8. A system as claimed in claim 1, wherein said support fluid comprises a supply of hydraulic fluid.

9. A system as claimed in claim 8, wherein a flow regulating valve is adapted to control the return to a reservoir from said support chamber so that brake re-application takes place at a controlled rate, determined by a flow rate permitted by said regulating valve.

10. A system as claimed in claim 1, wherein said support fluid is pneumatic.

11. A system as claimed in claim 1, wherein support fluid is supplied to a single support chamber.

12. A system as claimed in claim 1, wherein said support fluid is supplied to a plurality of support chambers and faces of different areas on said piston separate said support chambers whereby to bias said piston between said advanced and retracted positions.

13. A system as claimed in claim 12, wherein a flow-regulating valve is provided, and the return movement of said de-boost piston is controlled by the transfer of fluid from one support chamber to another support chamber via said flow-control regulating valve.

14. A system as claimed in claim 12, wherein two support chambers are provided and said second valve is arranged, in a normal operative position, to subject enlarged opposed faces of said de-boost piston to differential pressures, whereby to hold said piston in said advanced position with such pressures being equalised in response to a skid signal so that the de-boost piston is permitted to move into said retracted position, said differential pressures being re-established at the termination of said skid signal.

15. A system as claimed in claim 1, including a reservoir for fluid, and a pump drawing fluid from said reservoir, wherein said support fluid is hydraulic and said support fluid is supplied to a single support chamber by said hydraulic pump which is controlled by the generation of a skid signal, said second valve normally closing communication between said support chamber and said reservoir, but, in response to a skid signal, said second valve opens to release said support fluid from said support chamber to said reservoir simultaneously with said pump being operated to pump said support fluid in a closed circuit through said support chamber with said pump continuing to operate after closure of said second valve at the termination of the skid signal in order to re-pressurise said support chamber whereby to return said de-boost piston to said advanced position at a rate determined by said pump, at which point said first valve re-opens and said pump ceases to operate.

16. A system as claimed in claim 1, wherein said hydraulic accumulator is adapted to supply hydraulic support fluid to said support chamber.

17. A system as claimed in claim 16, wherein a flow-regulating valve is provided through which hydraulic support fluid is supplied to said support chamber from said hydraulic accumulator.

18. A system as claimed in claim 17, wherein said second valve normally closes communication between said support chamber and a reservoir from which said accumulator is charged with hydraulic pressure fluid, and said support chamber is pressurised to hold said de-boost piston in said advanced position by pressure fluid supplied to said support chamber through said regulating valve, said second valve opening in response to a skid signal to release said support fluid from said support chamber to said reservoir, and, at the termination of the skid signal, said accumulator being adapted to replenish said support chamber at a rate determined by said regulating valve.

19. A system as claimed in claim 18, wherein operation of the first valve can be sequentially controlled with operation of the second valve by means of said flow-control regulating valve itself.

20. A system as claimed in claim 19, wherein a spring-loaded coupling is provided between said flow-control regulating valve and said first valve, which coupling is constructed and arranged to open said first valve, or to hold said first valve open, when no fluid is flowing through said flow control regulating valve.

21. A system as claimed in claim 18, wherein first valve can be operated in response to said skid signal independently of operation of said second valve in response to said skid signal.

22. A system as claimed in claim 17, wherein said the flow control regulating valve and said de-boost piston are arranged in interconnected spaced bores in a common housing.

23. A system as claimed in claim 17, wherein operation of said first valve is controlled by said flow-control regulating valve and said position sensing means comprises said flow-control regulating valve itself in combination with a spring which is operative to open said first valve when no fluid is flowing through said flow-control regulating valve.

24. A system as claimed in claim 1, wherein said first valve is operated electrically independently of said second valve, and in response to said skid signal, a switch is operated by said de-boost piston to cause said first valve to re-open only when said de-boost piston has returned to its advanced position.

* * * * *

UNITED STATES PATENT AND TRADEMARK OFFICE
CERTIFICATE OF CORRECTION

PATENT NO. : 4,436,348
DATED : March 13, 1984
INVENTOR(S) : Glyn P. R. Farr

It is certified that error appears in the above-identified patent and that said Letters Patent are hereby corrected as shown below:

The assignee should read as follows:

-- Lucas Industries public limited company, Birmingham, England--.

Signed and Sealed this

Tenth Day of July 1984

[SEAL]

Attest:

Attesting Officer

GERALD J. MOSSINGHOFF

Commissioner of Patents and Trademarks